United States Patent [19]
Hall, Jr. et al.

[11] Patent Number: 6,108,003
[45] Date of Patent: Aug. 22, 2000

[54] MAINTAINING VISIBILITY AND STATUS INDICATION OF DOCKED APPLICATIONS AND APPLICATION BARS

[75] Inventors: George E. Hall, Jr., Hillsborough; Mark Edward Molander, Cary; Ian Beaumont Shields, Raleigh, all of N.C.

[73] Assignee: International Business Machines Corporation, Armonk, N.Y.

[21] Appl. No.: 09/040,732

[22] Filed: Mar. 18, 1998

[51] Int. Cl.[7] .................................................. G06F 3/00
[52] U.S. Cl. ........................... 345/340; 345/348; 345/342
[58] Field of Search .................................. 345/340, 341, 345/342, 348, 349

[56] References Cited

U.S. PATENT DOCUMENTS

| | | | |
|---|---|---|---|
| 5,333,256 | 7/1994 | Green et al. | |
| 5,473,745 | 12/1995 | Berry et al. | |
| 5,586,244 | 12/1996 | Berry et al. | 345/340 |
| 5,644,737 | 7/1997 | Tuniman et al. | 345/352 |
| 5,657,049 | 8/1997 | Ludolph et al. | 345/348 X |
| 5,812,804 | 9/1998 | Bates et al. | 345/342 X |
| 5,825,348 | 10/1998 | Ludolph et al. | 345/342 X |
| 5,841,436 | 11/1998 | Nakamura | 345/342 |
| 5,883,626 | 3/1999 | Glaser et al. | 345/342 |
| 5,896,132 | 4/1999 | Berstis et al. | 345/341 |
| 5,903,268 | 5/1999 | Hirayama | 345/342 |
| 5,923,326 | 7/1999 | Bittinger et al. | 345/340 |
| 5,956,032 | 9/1999 | Argiolas | 345/342 |
| 5,999,159 | 12/1999 | Isomura | 345/342 |

*Primary Examiner*—Raymond J. Bayerl
*Assistant Examiner*—Cao H. Nguyen
*Attorney, Agent, or Firm*—Jeanine S. Ray-Yarletts

[57] ABSTRACT

A method and system is presented which enables the user to maintain the receipt of information from an application bar while the application bar is minimized. In addition, the conveyance of information and availability of controls to the user is maintained while the user moves the window which the application bar is docked to off or around the presentation space.

3 Claims, 11 Drawing Sheets

MAINTAINING VISIBILITY AND STATUS INDICATION OF DOCKED APPLICATIONS AND APPLICATION BARS

FIELD OF THE INVENTION

The present invention relates generally to docked applications and application toolbars. More specifically, it relates to continuously maintaining visibility of and accessability to docked applications, including conveying information to a user while docked applications are presented as a minimal pixel representation.

BACKGROUND OF THE INVENTION

Increases in processing capability and decreases in the cost of personal computers has led to the proliferation of personal computers in all aspects of society. Personal computers are utilized in schools, homes and business. Furthermore, with the decreased cost of personal computers, it has become more feasible from a cost perspective to use computers for tasks and functions which were previously done without the use of computers.

With the proliferation of computers throughout numerous aspects of life, a tendency towards graphical user interfaces has evolved which makes the use of the computer more intuitive and therefore requires less expertise of the users. Examples of such graphical user interfaces include IBM® OS/2®, Apple® System 7®, and Microsoft® Windows®. These operating systems all rely on a "window-like" work space for applications, operating system information such as directory information, and program groupings.

As users become more comfortable with many benefits of a computer they are using additional functions and features of the computer. Since most applications are now associated with their own window or windows and there are more applications that people are using concurrently, the desktops are becoming extremely cluttered. When the application tool bars (or appbars) and the windows they are docked to (i.e. attached along as a common edge) are also taken into account, the confusion of the desktop becomes even more apparent. This is very obvious in a mobile environment where a typical user may have a host emulator session, an e-mail application, multiple browser sessions, an application such as a word processor and still needs to monitor his signal strength and battery strength. In an effort to organize their desktops, many people are moving parts of windows off to the sides so that much of these windows is outside of the view of the user. This allows the user to be aware of the window and the application that is running in it without the application consuming a considerable amount of screen space, but this methodology also causes a problem in that important information may be scrolled or positioned outside of the user's view. Many users also choose to move their appbars out of view by putting them into a mode called hide mode. This causes the appbar to be readily accessible by indicating or activating it using the cursor, which makes it unhidden (i.e., fully visible), but only displays an edge of the appbar, referred to hereinafter as a 'visible strip'. The preferred embodiment implements this visible strip as a two-pixel strip although any indication of or subset of the appbar could be used. A mode called auto-hide also allows the appbar to automatically enlarge itself when the cursor is positioned over the visible strip.

The problem of appbar or status bar hiding becomes more intense as appbars, docked to applications, get moved off the edge of the screen and out of the view of the user.

OBJECTS OF THE INVENTION

It is an object of the present invention to notify a user in a windowed computer environment of changes in the status or state of applications.

If is a further object of the present invention to inhibit the user from inadvertently making important status information nonobvious or not readily accessible.

It is yet another object of the present invention to minimize the use of screen space while conveying information to the user in a windowed environment.

SUMMARY OF THE INVENTION

The present invention presents unique methods of allowing a user in a windowed environment to be made aware of changes to applications by way of the appbar while still enabling the user to place the appbar in hide mode or move the application window to which the appbar is docked partially off the presentation space. This is done by symbolically coding the minimal pixel representation of the hidden appbar and/or prohibiting the appbar from being located outside the viewable presentation space. The present invention will be described in further detail with respect to the figures.

DETAILED DESCRIPTION OF THE PREFERRED EMBODIMENT

The preferred embodiment of the present invention is presented in an information processing system having a presentation space upon which one or more presentation windows reside. Methods are presented which maintain the information conveyance to the user through an application bar either in visible mode or in hidden mode. The methods include the movement of the application bar from an edge to which it is docked to a more visible adjacent or opposite edge when the user attempts to position the window which is edge attached to the application bar off the screen, preventing further movement of a window when the user attempts to move the portion of the window containing the application bar off the screen, or presenting status information in the application bar in a minimized form using the minimized pixel representation of an application bar in hidden mode. The current art provides this minimized pixel representation as two pixels, but one skilled in the art could easily modify this representation to any subset or representation of pixels smaller than the entire presentation of the application bar. The currently used terms of 'auto hide mode' and 'hidden mode' are slightly confusing because in the current art this mode does present a minimal pixel indication of the underlying application, making the appbar not completely hidden. The use of such a narrow strip of pixels in the current art is to provide a surface to activate with the pointer so that the hidden window can easily be made visible and to indicate to the user that the hidden bar exists, but it conveys no other information with the minimal pixel representation itself. The present invention takes advantage of using this minimal pixel representation to present additional status information.

Figure 1A:
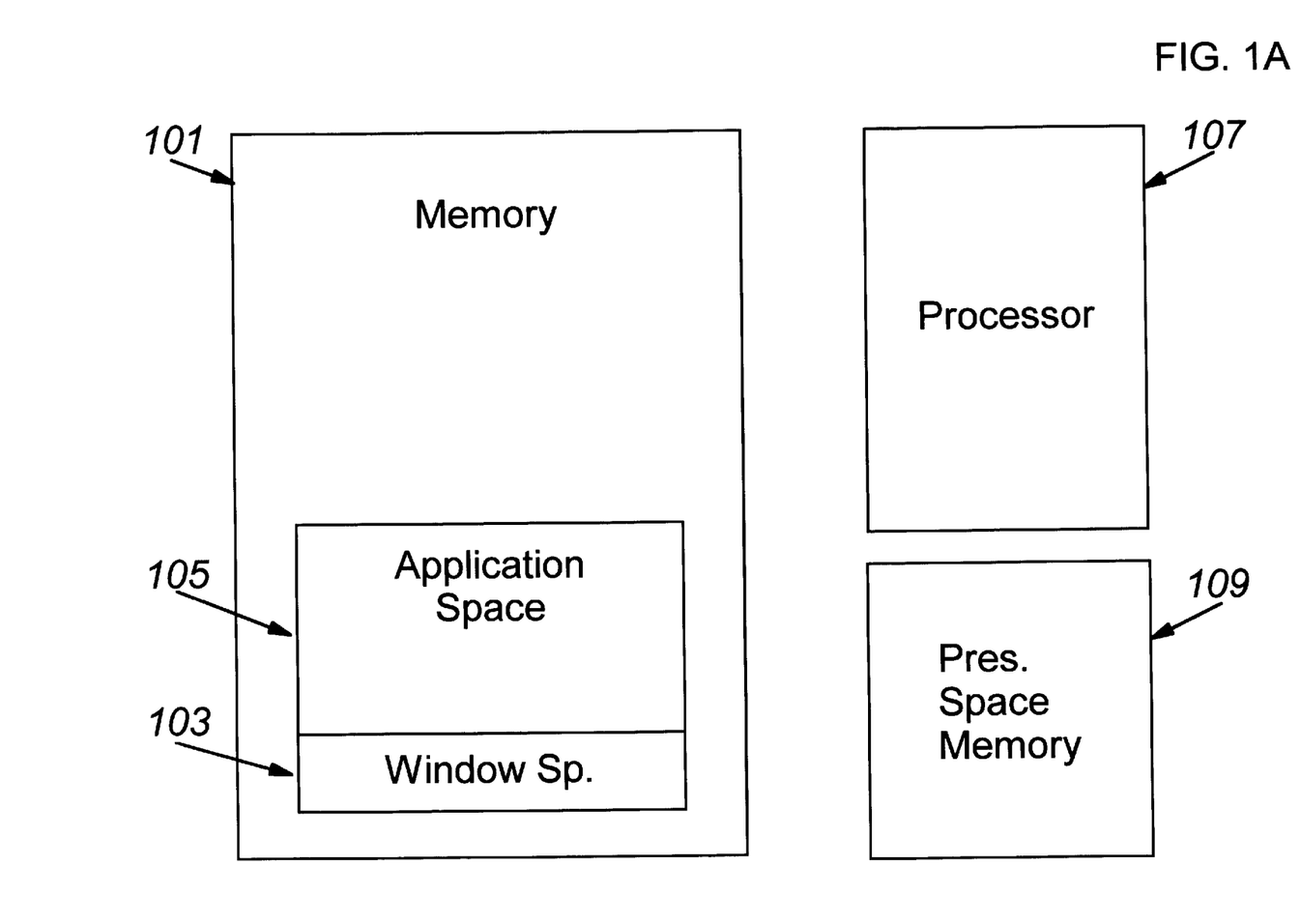
FIG. 1a is a block representation of a computer in which the present invention may be embodied.

FIG. 1a is a symbolic representation of a computer in which the present invention may be embodied. The computer has associated with it at least a processor 107, memory 101 and a presentation space memory 109. The presentation space is an area of memory which is associated with what is displayed on an output device 121 as shown in FIG. 1c.

Figure 1B:
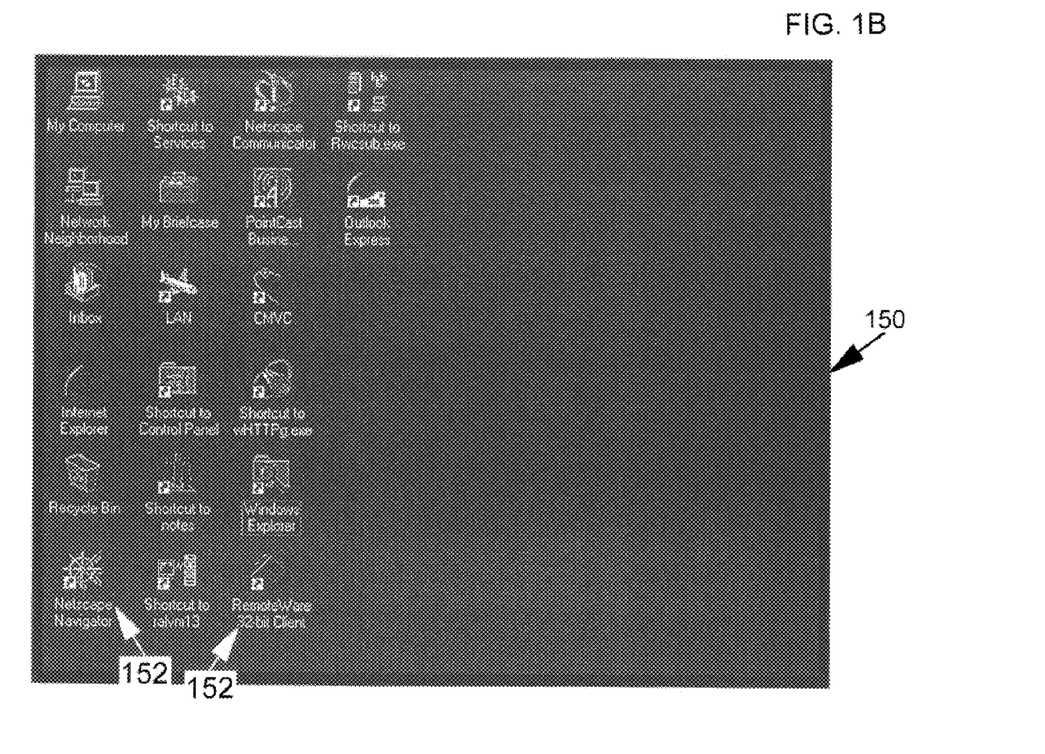
FIG. 1b shows a typical display presentation space.
Figure 1C:
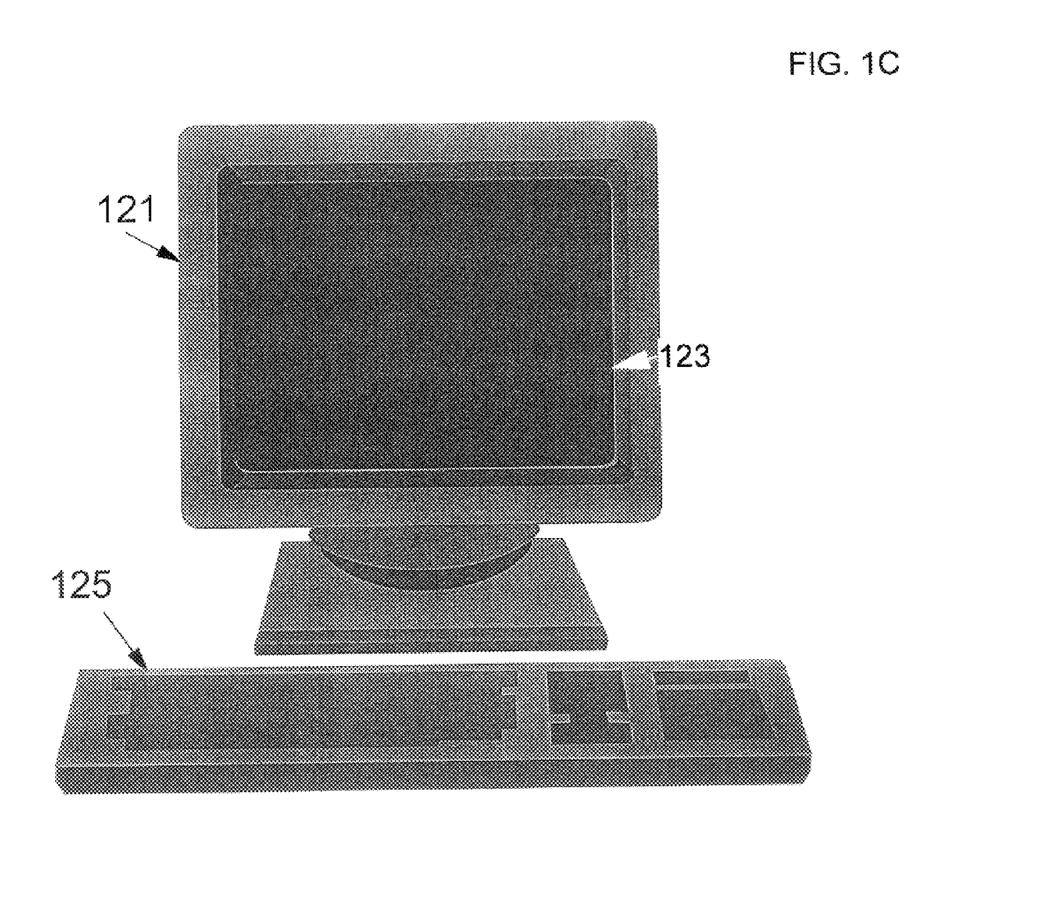
FIG. 1c represents a typical display device and keyboard.

FIG. 1c provides a pictorial example of a display device 121 which contains a presentation space 123 upon which one or more windows may be displayed. FIG. 1c also depicts an input device 125 which can be any of a multitude of input devices well known in the art. The display device 121 and input device 125 are both connected to a processor presented in FIG. 1a.

FIG. 1b is exemplary of the content 150 of a presentation space 123 residing on a display device 121 as presented in FIG. 1c. The presentation space 123 contains several icons 152, each icon representing an application.

Figure 2:
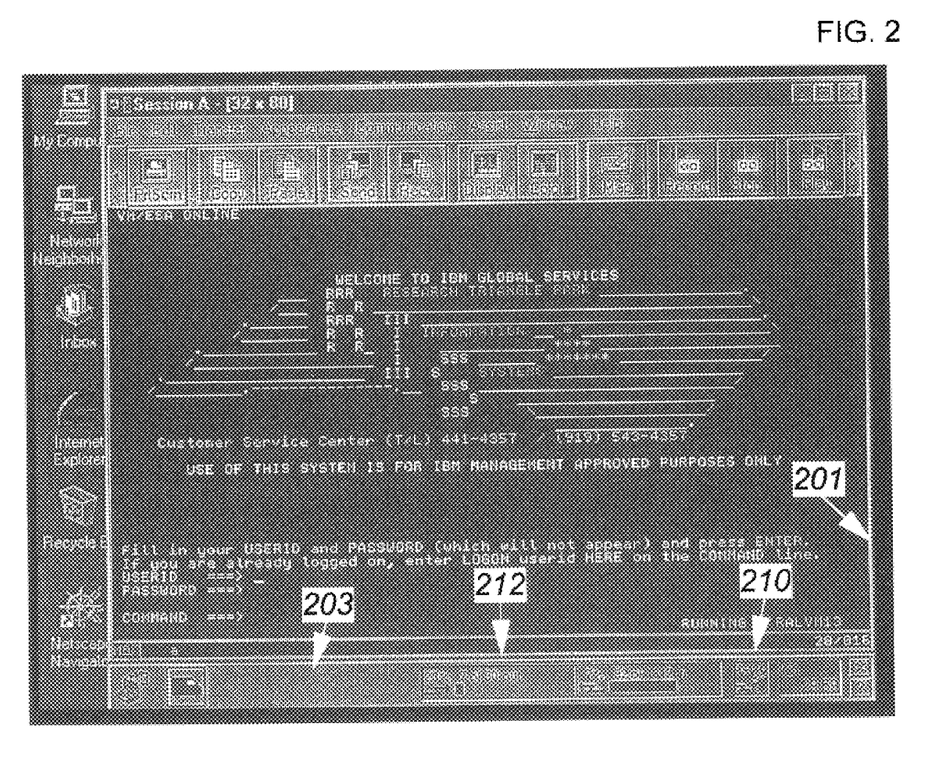
FIG. 2 is an example of a typical appbar docked to an edge of an application window.

FIG. 2 demonstrates an application window being opened 201 which may be done by double clicking on the icon 152 associated with the application or by any other means as will be obvious to one skilled in the art. In the present example of the preferred embodiment the user has opened an emulator session on a mobile computer. In a mobile or wireless computing environment, it is very important to be aware of the quality of the connection at all times, therefore when the window is opened for the emulator session, an appbar 203 is attached to an edge of the application window to display the status of the connectivity with the server 210 and signal strength 212 as well as other important information. When the window is presented as in FIG. 2, the users are constantly reminded of the status of their critical connection information, but this occupies what can become critical presentation space, especially when there are multiple application windows opened or the presentation space is rather small as it is on some notebook or hand held computers. When screen space becomes a premium concern, many users choose to run with their appbars in hidden mode as shown in FIGS. 3a and 3b.

Figure 3A:
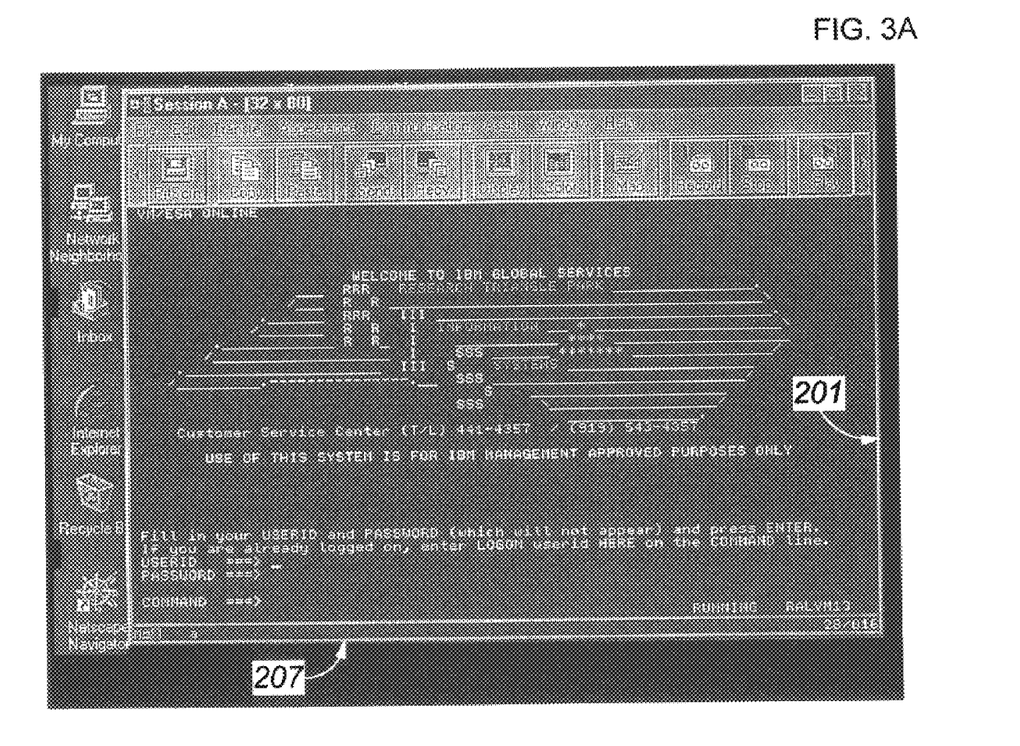
FIG. 3a is an example of a typical docked appbar in hide mode.
Figure 3B:
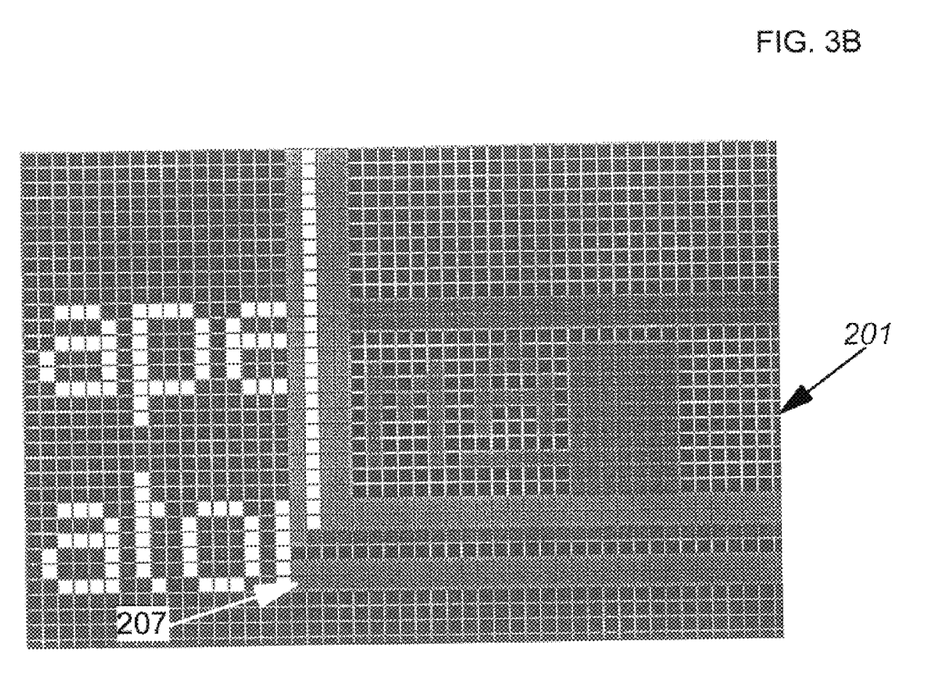
FIG. 3b is a close-up view of an appbar in hide mode.

FIG. 3a shows the emulator application of FIG. 2 with the appbar hidden 207. In hidden mode, as implemented in the preferred embodiment, the user is only presented a two-pixel line 207 indicating that there is something attached to the application that can be opened or expanded. When the user moves the pointer over the narrow visible edge of the hidden appbar, or alternatively clicks on the narrow visible edge, the appbar will expand to its full size. As is obvious to one skilled in the art, any subset or portion of the actual appbar could be used to place the appbar in hide mode and the current two pixel implementation is small enough to be unobtrusive yet still be accessible. FIG. 3b is a close-up view of the left side of the appbar in hide mode.

Figure 6A:
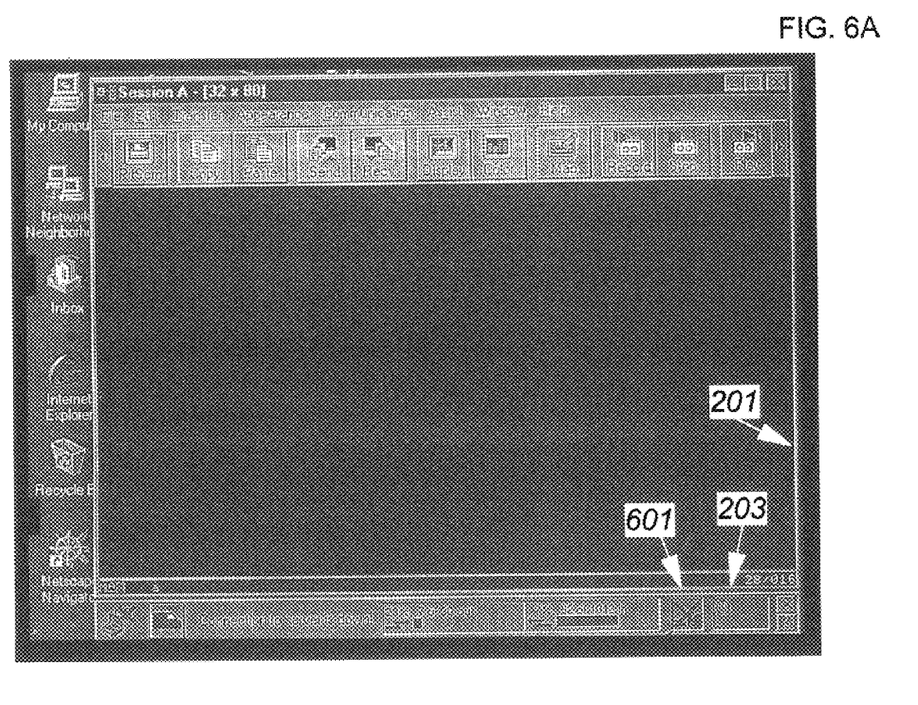
FIG. 6a depicts the automatic displaying of a hidden appbar when a threshold is reached or a status changes.
Figure 6B:
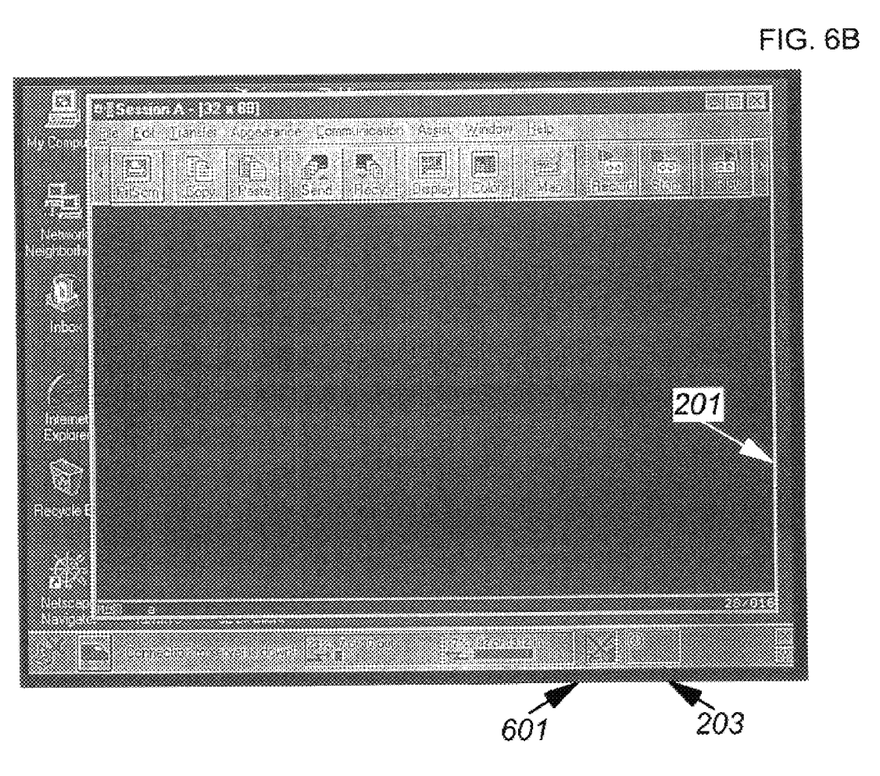
FIG. 6b deptict an appbar that is attached to the edge of the presentation space and has become unhidden.

In the scenario of FIG. 3a, if the user is working on the computer with the appbar hidden and using the emulator session and the quality of the connection with the server is degraded, the user is not notified until there is a failure in the system. This failure could cause unnecessary loss of data. An object of the present invention is to ensure that this information is presented to the user prior to the actual failure, while not consuming valuable presentation space on a continuous basis. A first method of accomplishing this is to allow the user to create a profile (or to provide a default profile) for the appbar that indicates thresholds for each of the status indicators in the appbar. If any of the status indicators exceeds its predetermined threshold and the appbar is in hide mode, the appbar automatically becomes unhidden to notify the user of the problem. In this example, if the user were running the emulator session of FIG. 3a and the server response time decreased below the threshold set in the profile, the appbar would return to its full size as in FIG. 6a with the indicator highlighted 601. FIG. 6b displays this same concept with the appbar docked to the edge of the presentation space rather than the edge of a window.

Figure 5A:
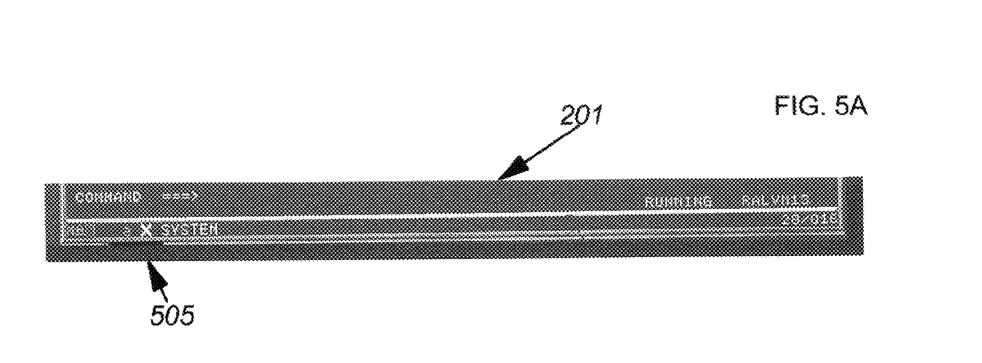
FIGS. 5a & 5b depict a progress indicator in the visible edge of a hidden appbar.
Figure 5B:
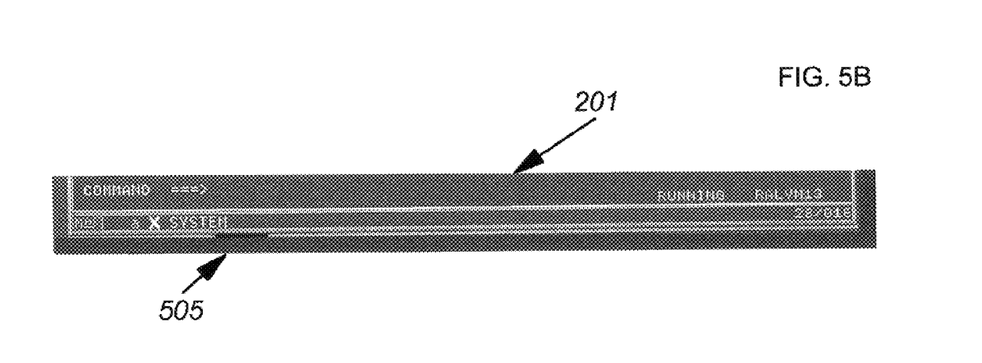

An alternative method of notifying the user without returning the appbar to it's original size would be to provide some other visual indication using the minimal pixel representation of the appbar. One method of accomplishing this is shown in FIGS. 5a and 5b. FIGS. 5a and 5b show a fluctuation in the appearance of the hidden appbar. This could be a change in color or a change in shade or intensity and could present itself in many embodiments such as flashing, a gradual intensity modification more like a wave, or by having subsets of the minimal pixel line change color or intensity in sequence as is represented in FIGS. 5a and 5b, where the darker subset of the pixels 505 move across the bottom of the narrow presentation space 201.

Figure 4A:
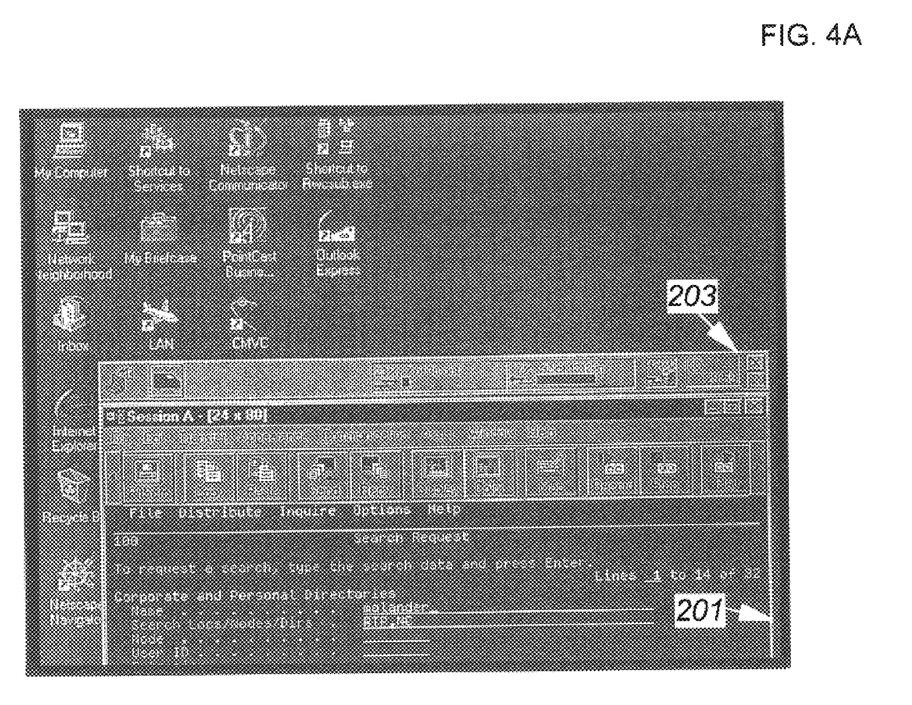
FIG. 4a depicts the movement of the appbar to the adjacent edge when the user attempts to position the appbar off the screen.

Another problem with the use of appbars in conveying application critical status to the user is that users sometimes move the application windows partially or wholly off the space 123. When the user moves the appbar off the presentation space, the same problem occurs as it does for hidden appbars. A first solution to this problem would be to programmatically prevent the user from moving the appbar off the presentation space. While this is effective, it can be rather bothersome to the user. FIG. 4a demonstrates a method of maintaining the conveyance of information to the user as they move the application window across the presentation space. As the user moves the window 201 of FIG. 2 down the presentation space 123, the appbar is automatically moved to an edge where it is more visible. FIG. 4a shows the appbar 203 now attached to the top of the application window 201. When the movement of the docked appbar is to the opposite edge, the movement of the appbar is rather simple. It is just detached from one edge and attached to the other. When the furthest edge of the application window from the presentation space is an adjacent edge to that which the appbar is presently docked, normal programming skill must be used to rotate the appbar 90 degrees.

Figure 4B:
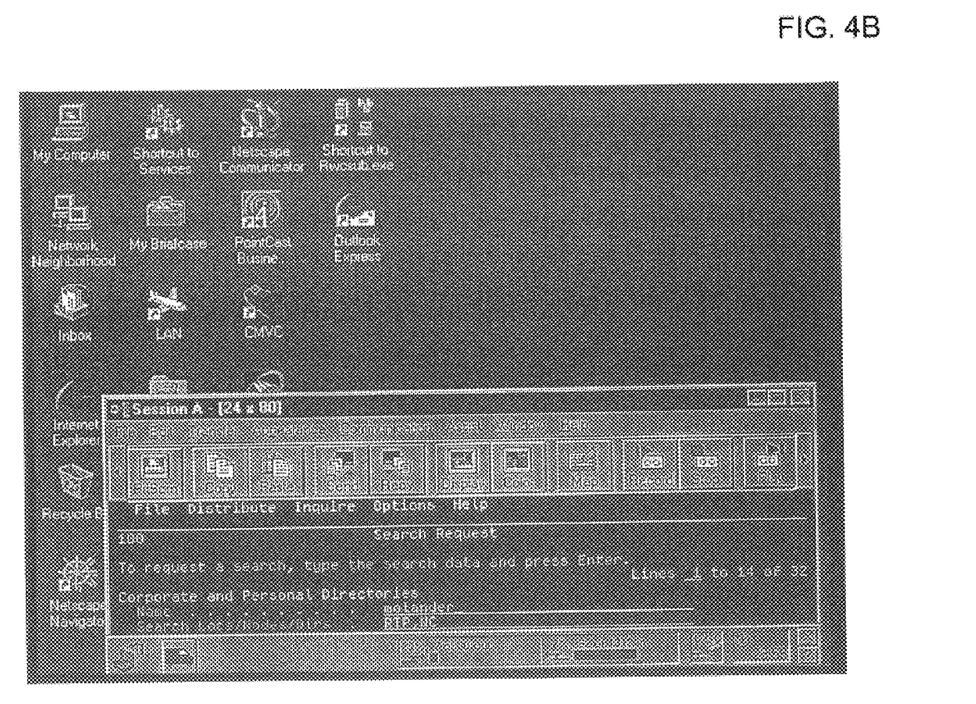
FIG. 4b depicts the appbar remaining in place as the window to which it is attached is positioned beneath it and off the screen.

Another solution to the problem of the user moving appbars edge docked to windows off the presentation space is addressed in FIG. 4b. In FIG. 4b the appbar 203 stops moving when it reaches the edge of the presentation space and the application window 201 to which it is attached continues to move off the presentation space underneath the appbar until the point where the appbar is the only portion of the application window left visible.

What is claimed is:

1. In an information processing system having a presentation space upon which one or more windows reside, a method of presenting a change in status of an application having an application bar in hidden mode wherein a change in status would cause the application bar to change from hidden mode to a more fully visible mode wherein a user configured a profile for said application bar, said profile containing one or more tolerances for the status of said application bar such that said application bar only changed to a more fully visible mode when said one or more tolerances were exceeded.

2. In an information processing system having a presentation space upon which one or more windows reside, computer readable coded for presenting a change in status of an application having an application bar in hidden mode wherein a change in status would cause the application bar to change from hidden mode to a more visible mode and wherein a user configured a profile for said application bar, said profile containing one or more tolerances for the status of said application bar such that said application bar only changed to said more visible mode when said one or more tolerances were exceeded.

3. An information processing system having a presentation space upon which one or more windows reside, means of presenting a change in status of an application having an application bar in hidden mode wherein a change in status would cause the application bar to change from hidden mode to a more visible mode and wherein a user configured a profile for said application bar, said profile containing one or more tolerances for the status of said application bar such that said application bar only changed to said more visible mode when said one or more tolerances were exceeded.

* * * * *